US008205331B2

(12) United States Patent
Braly

(10) Patent No.: US 8,205,331 B2
(45) Date of Patent: Jun. 26, 2012

(54) FULL TIME LEAN RUNNING AIRCRAFT PISTON ENGINE

(76) Inventor: George W. Braly, Ada, OK (US)

( * ) Notice: Subject to any disclaimer, the term of this patent is extended or adjusted under 35 U.S.C. 154(b) by 653 days.

(21) Appl. No.: 12/359,984

(22) Filed: Jan. 26, 2009

(65) Prior Publication Data

US 2010/0229809 A1 Sep. 16, 2010

Related U.S. Application Data

(60) Provisional application No. 61/062,226, filed on Jan. 24, 2008.

(51) Int. Cl.
*B64D 27/04* (2006.01)

(52) U.S. Cl. .................. 29/888.011; 244/53 R; 244/54; 244/55

(58) Field of Classification Search ............. 29/888.011; 244/53 R, 54, 55
See application file for complete search history.

(56) References Cited

U.S. PATENT DOCUMENTS

| | | | | |
|---|---|---|---|---|
| 1,741,032 | A | 12/1929 | Minter | |
| 2,394,180 | A | 2/1946 | Imm | |
| 4,232,643 | A * | 11/1980 | Leshner et al. | 123/435 |
| 4,305,364 | A | 12/1981 | Stuckas | |
| 4,400,944 | A | 8/1983 | Iwamoto et al. | |
| 4,452,207 | A | 6/1984 | Moore, Jr. | |
| 4,475,380 | A | 10/1984 | Colovas et al. | |
| 5,067,460 | A | 11/1991 | Van Duyne | |
| 5,125,235 | A | 6/1992 | Yanagihara et al. | |
| 5,251,601 | A * | 10/1993 | Leshner | 123/436 |
| 5,253,630 | A | 10/1993 | Akazaki et al. | |
| 5,941,222 | A | 8/1999 | Braly | |
| 6,317,680 | B1 | 11/2001 | Luttrell et al. | |
| 6,725,659 | B1 | 4/2004 | Shao et al. | |
| 6,726,512 | B2 | 4/2004 | Saito | |
| 6,866,023 | B2 | 3/2005 | Hasegawa | |
| 6,889,502 | B1 | 5/2005 | French et al. | |
| 7,039,518 | B2 | 5/2006 | Ingram et al. | |
| 7,658,184 | B2 * | 2/2010 | Matas et al. | 123/676 |
| 7,871,032 | B2 * | 1/2011 | Zhao et al. | 244/6 |
| 7,979,193 | B2 * | 7/2011 | Harbert | 701/103 |
| 2008/0001038 | A1 * | 1/2008 | Daggett | 244/53 R |
| 2009/0099755 | A1 * | 4/2009 | Harbert | 701/103 |

OTHER PUBLICATIONS

Derek Dunn-Rankin, Paper entitled, “Lean Combustion Technology and Control”, Department of Mechanical and Aerospace Engineering, University of California, Irving, California, Elsevier, Inc., 2008, (pp. 95-120).
J.N. McDonald, Paper entitled, “Control and Measurement of Fuel Consumption in Operation”, Wright Aeronautical Corporation, 1940.
Robert E. Johnson, Paper entitled, “Power Control and Its Effect Upon Economy”, Wright Aeronautical Corporation, 1941.

* cited by examiner

*Primary Examiner* — Erick Solis
(74) *Attorney, Agent, or Firm* — R. Reams Goodloe, Jr.

(57) ABSTRACT

A full time lean air fuel mixture running spark ignited air cooled aircraft piston engine. In one embodiment, a drop-in substitution is provided for an equivalent make, model, and engine size, wherein the new, rebuilt, or reconfigured engine provides as much or more horsepower when compared to the original engine, but runs at a lean air fuel ratio condition during normal operating modes, including takeoff, climb, and cruise, thus saving significantly on fuel. In yet another embodiment, a drop-in substitution having a somewhat larger cylinder displacement volume may be provided to attain equivalent or enhanced maximum horsepower while operating at lean air fuel ratios. Enhanced engine life may be anticipated, since cylinder head temperatures (CHTs) may be reduced, compared to engines using rich air fuel ratios for climb and cruise conditions. Aircraft using such engines are also disclosed.

57 Claims, 5 Drawing Sheets

FULL TIME LEAN RUNNING AIRCRAFT PISTON ENGINE

RELATED PATENT APPLICATIONS

This application claims priority from prior U.S. Provisional Patent Application Ser. No. 61/062,226, filed on Jan. 24, 2008.

COPYRIGHT NOTICE

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to designs for and methods of operating spark ignition piston engines in general aviation aircraft, and more particularly, to improving fuel efficiency, increasing longevity, and reducing carbon dioxide and carbon monoxide emissions from such engines.

BACKGROUND

The existing fleet of general aviation spark ignition piston engines, as well as new engines currently being delivered, and engines which are overhauled for use as replacements on existing aircraft, typically operate with a stoichiometric rich air/fuel mixture ratio, often abbreviated as the "AFR". Quite simply, this means that with respect to the amount of fuel, there is not enough air in the rich AFR mixtures to completely react with all of the fuel molecules present in the air/fuel mixture being fed to the engine. That means that the fuel provided to the engine is not completely utilized in the chemical reaction of fuel burn, and consequently, it is clear that such a condition does not optimize the amount of work provided for the amount of fuel consumed, as measured by the brake specific fuel consumption, often abbreviated as "BSFC".

Importantly, existing general aviation aircraft engines are typically designed and configured so that when operated at full power, the aforementioned AFR is set to a relatively rich condition. Further, such engines are typically designed and configured so that when operated at cruise power, the AFR continues to be maintained relatively fuel rich, albeit often slightly less rich than is the case at a "full power" mixture setting.

Since maximum engine output (e.g. horsepower available for takeoff) has been the most significant limiting constraint for general aviation aircraft in terms of maximum takeoff weight and climb performance, especially for piston powered aircraft and rotorcraft, aircraft piston engines have typically been designed and operated to provide their maximum horsepower output (i.e., maximum BHP) under takeoff conditions. For this reason, an historically consistent configuration utilized for such engines has been that the engines have been designed and operated so that the AFR has been set rich, and often quite rich, as heretofore believed necessary to maximize available horsepower at takeoff, as well as to maximize available horsepower during the climb portion of a typical flight profile. An additional (and necessary reason under prior art practices) for operating these engines during takeoff and climb at rich AFR is that such rich AFR have been required in order to provide adequate control of cylinder head temperatures, in order to prevent overheating and to provide adequate margins from detonation. In many cases, instructions as to the required rich AFR for such engines has been set forth in the engine manufacturer's operational manuals, and as further and more definitively provided by the manufacturer of aircraft in which such engines are utilized.

Attention is directed to FIG. 1, where those skilled in the art of aircraft and rotorcraft piston engine design and operation will recognize the classic relationships between equivalence ratio (defined below), which is representative of the air fuel ratio ("AFR") used in an engine, the brake horsepower ("BHP"), brake specific fuel consumption ("BSFC" and also defined below), and cylinder head temperatures ("CHT"), for a typical spark ignition aircraft piston engine. Such curves might vary somewhat, depending on the qualities of the fuel being combusted, the spark timing advance, and the actual mass of airflow through the cylinder. However, in so far as I am aware, general aviation spark ignition piston engines currently are configured to operate at full power during the critical takeoff and initial climb phase of flight with the AFR operated at or near a full rich condition, with operating parameters as indicated in FIG. 1 at points 1A (showing BHP), 1B (showing CHT), and 1C (showing BSFC). In many instances, various makes and models of such engines are actually operated at still richer mixtures than those indicated in FIG. 1 in order to avoid detonation and to provide for adequate cooling of the materials of construction of the engine, particularly the piston, cylinder, and exhaust valve during critical phases of flight.

It can be observed from FIG. 1 that another desirable setting for the AFR might be at the location indicated by points 1D (showing BHP), 1E (showing CHT), and 1F (showing BSFC). However, if the AFR were adjusted to operate in an area generally described by the points just mentioned, while the engine would operate much more efficiently (i.e., better BSFC), and slightly cooler (lower CHT shown at point 1E than at point 1B), and with reduced $CO_2$ emissions, the available engine horsepower (BHP) would decline by some 8 to 10 percent, which for example can be seen by comparing the BHP at point 1A with the BHP at point 1D. Such prior art aircraft engine lean conditions may be (and have been) tolerated or, in a limited number of cases, encouraged, during the cruise portion of a flight. However, such a loss of available horsepower, if that were the situation during the critical takeoff and climb phases of flight, is generally considered to be unacceptable. That is because, in terms of the performance of the aircraft, such decreased horsepower negatively affects the takeoff distance quite significantly, and also markedly increases the distance required for the aircraft to climb and to clear obstacles in the takeoff path. Unfortunately, even if such a performance reduction as just described was accepted by the aircraft operator, in order to legally operate such aircraft with the same engines but set up to run at such a reduced maximum available takeoff BHP, many existing aircraft would have to be recertified. That process would be quite expensive, and would entail going through an extensive regulatory recertification process to obtain a "supplemental type certificate" for the use of such a reconfigured engine in the aircraft. In some case, re-certification at a lower horsepower level would be practically impossible due to performance constraints. In the United States, and most countries, the certification activity is an expensive governmental process. In the United States, it is administered by the Federal Aviation Administration (the "FAA").

Further, if spark ignited piston engines reconfigured as just described above were utilized in twin engine general aviation aircraft, a BHP loss in the range of 8 to 10 percent, when compared to the original "as certified" engine available takeoff horsepower (e.g. see point 1A as compared to point 1D in FIG. 1), would almost always be unacceptable. That is because even such a relatively modest amount of reduction in horsepower would, in many cases, virtually eliminate the ability of the aircraft to continue to climb with an acceptable climb rate while using only a single remaining good engine, in the event it becomes necessary to shut down one of the two engines due to a mechanical emergency.

Consequently, there still remains an as yet unmet need for an aircraft engine design, and a method for operation of such engines, that takes full advantage of the mechanical design components with respect to mass flow of air into the engine, and materials of construction utilized, that is capable of operating at lean AFR conditions, with good compression ratios, in a stable and highly efficient manner in all flight operating conditions. In order to meet such need and to provide a method for the design and operation of engines that can reliably achieve such operational conditions, it has become necessary to address the basic technical challenges presented in order to develop workable operating conditions, and methods for maintaining such conditions in spark ignition aircraft piston engines. Thus, it would be advantageous to provide for aircraft engines that can achieve the same BHP output during takeoff as counterpart (e.g. same or virtually identical engine specification) prior art rich AFR operating engines, but which can be operated at reduced fuel burn, and with less wear and tear on the mechanical components of the engines, as well as routine operation with reduced carbon foot print. Moreover, it would be advantageous to accomplish such goals while providing an engine suitable for drop-in substitution, or while providing a procedure for modification or rebuild of existing engines, which provides such advantages, in order to minimize the extent, complexity, and cost of any required recertification efforts of the critical high power performance portion of the operating envelope of existing aircraft.

SUMMARY

Full time lean running ("FTLR") spark ignited aircraft piston engines are provided by way of the present invention. In an embodiment, a drop-in substitution is provided for an equivalent make, model, and engine size, wherein a new, rebuilt, or reconfigured engine provides as much or more horsepower when compared to the original engine, but runs at a lean AFR condition during normal operating modes, including takeoff, climb, and cruise, thus saving significantly on fuel, and resultant costs thereof, and reducing the carbon emissions from such aircraft. In an embodiment, such replacement may enable the operator of an aircraft in which such replacement engine is utilized to substantially extend the operating range of the aircraft without increasing fuel tank size. Or, in another embodiment, that may enable the operator of such aircraft to load less fuel, but additional passengers and/or freight, while maintaining the original aircraft operating range. In yet another embodiment, a drop-in substitution having a somewhat larger cylinder displacement volume may be provided, to assure or still further enhance available maximum horsepower, while still operating at lean AFRs to achieve reduced fuel burn. In an embodiment, such a substitution may provide increased horsepower available for takeoff, climb, or cruise, yet provide such benefit with no more than, and in an embodiment, even less fuel burn, than was originally the case. Moreover, in any of such cases, enhanced engine life may be anticipated, since cylinder head temperatures (CHTs) may be reduced, compared to CHTs experienced with using original factory settings, and since internal engine deposits from excessively rich mixtures are eliminated.

BRIEF DESCRIPTION OF THE DRAWING

The present invention will be described by way of exemplary embodiments, using for illustration the accompanying drawing in which like reference numerals denote like elements, and in which.

Figure 1:
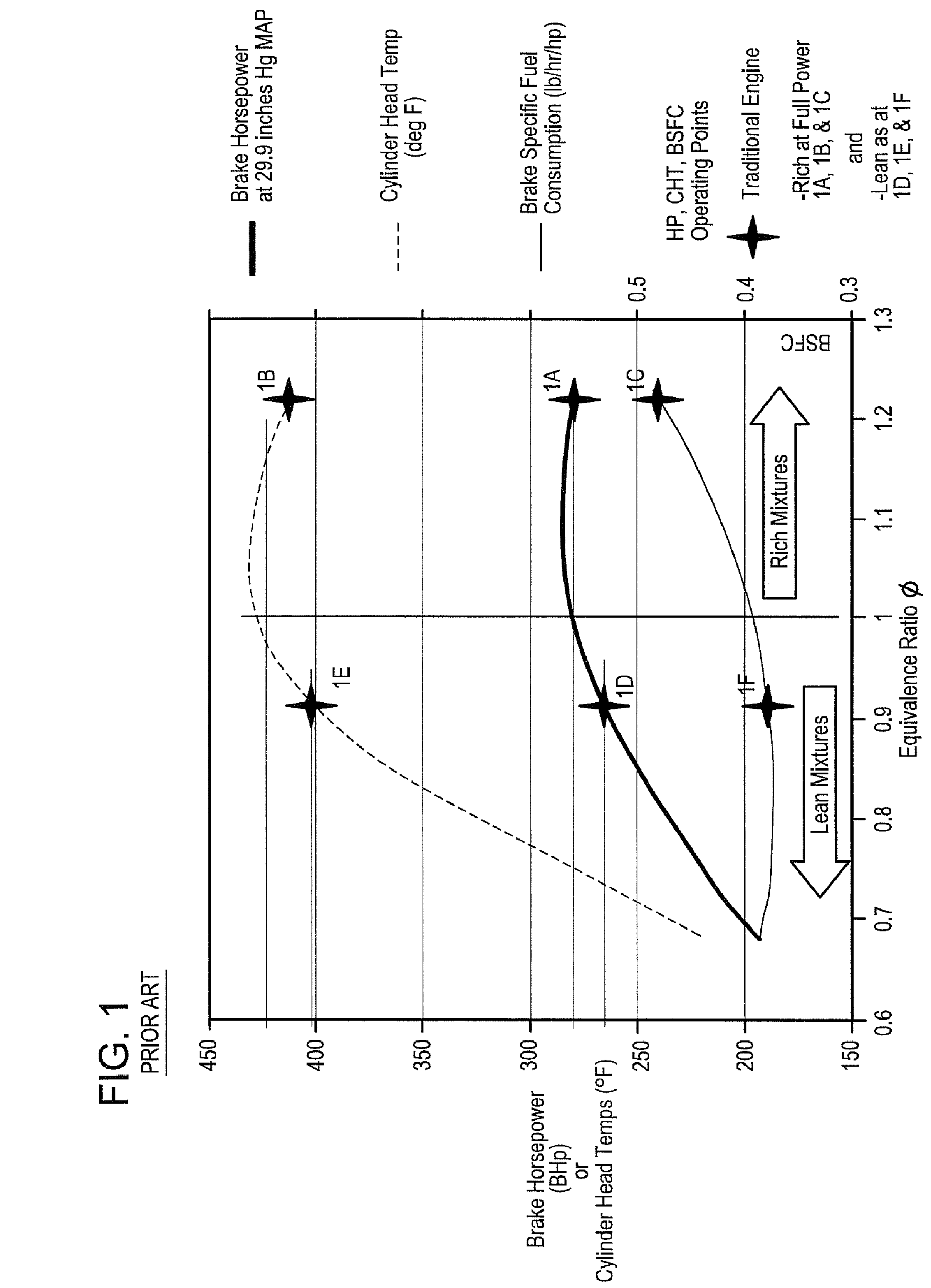
FIG. 1 PRIOR ART
FIG. 1 is a graphical representation of operating parameter curves for typical prior art aircraft piston engines.

The foregoing figures, being merely exemplary, contain various elements that may be present or omitted from actual engine designs or methods that may be implemented. Other piston aircraft engines use different designs for fuel metering and air flow metering (throttle) to those engines, but are mechanically susceptible to modifications and re-configuration similar to those as is described for components depicted in the drawings shown herein. An attempt has been made to draw the figures in a way that illustrates at least those elements that are significant for an understanding of the various designs and methods taught herein for maximizing horsepower output from spark ignited aircraft and rotorcraft engines while providing for reliable and efficient operation at lean AFRs. However, various other actions in the design of such engines, for assuring uniform AFR mixtures are supplied to individual cylinders of such engines, may be utilized in order to design a versatile aircraft or rotorcraft engine that minimizes or eliminates efficiency losses and adverse wear and tear on metallurgical components as heretofore inherent in aircraft or rotorcraft engine designs.

DETAILED DESCRIPTION

An exemplary method for the design and operation of highly fuel efficient aircraft engines is set forth herein. Throughout this specification, there is discussion of the term air fuel ratio ("AFR"), as well as the term equivalence ratio ("$\phi$"). For purposes of this specification, unless expressly set forth otherwise, or unless another interpretation is required by the specific context mentioned, the various AFR numbers as discussed and described in detail herein are provided as mass averaged values, wherein the term mass averaged means that the mass of air and the mass of fuel in the air-fuel mixture are subsequently averaged by the total flow of each of air and fuel.

Mathematically the expression for AFR can be simplified and described by the following equation:

$$AFR = \frac{m_{air}}{m_{fuel}}$$

Where:

AFR=air fuel ratio $m_{air}$=mass of air $m_{fuel}$=mass of fuel

With respect to equivalence ratio ("ϕ"), this term is used in combustion engineering to more precisely describe certain combustion conditions, namely the ratio of fuel-to-oxidizer actually utilized, when compared to the ratio of fuel-to-oxidizer at a stoichiometric fuel-to-oxidizer ratio. Mathematically the expression for equivalence ratio can be simplified and described by the following equations:

$$\Phi = \frac{\text{(fuel-to-oxidizer ratio)}}{\text{(fuel-to-oxidizer ratio)}_{st}} = \frac{(m_{fuel}/m_{ox})}{(m_{fuel}/m_{ox})_{st}}$$

Where:

ϕ=equivalence ratio $m_{fuel}$=mass of fuel $m_{ox}$=mass of oxidizer st=stoichiometric conditions With respect to brake specific fuel consumption ("BSFC"), this term is used in power engineering to more precisely describe the amount of fuel consumed per amount of power produced. The amount of fuel is normally expressed as the mass of fuel consumed per unit of time, e.g. pounds mass (per hour), and the work is expressed as the amount of work per unit of time, normally as horsepower (hour). Mathematically the expression for BSFC on can be expressed as set forth below:

$$BSFC = \frac{m_{fuel}/\text{hour}}{\text{Hp}}$$

Where:

BSFC=brake specific fuel consumption $m_{fuel}$=mass of fuel

Hp=Horsepower output of engine

In general, the potential power output of an internal combustion engine is ultimately limited by the mass of air that the engine can process per unit of time. Within reasonable limits, when the engine speed in revolutions per minute ("RPM") and the AFR remains constant, an increase in the pressure of the air supplied to the cylinders, generally reported as manifold absolute pressure ("MAP") of the air in the induction air manifold, will result in roughly a proportional increase the power output from the engine, in brake horsepower ("BHP"). It is common and convenient in reference to discussions concerning the power and performance of aircraft spark ignition piston engines at a given RPM to refer only to increases in MAP with respect to discussions of increases of the power output from the engine. However, a more precise discussion will always take into account changes in the temperature of the induction air associated with changes in the MAP so as to reflect the actual physical quantity, mass air flow, which is significant with respect to the power produced or which the engine is capable of producing. For purposes of the present disclosure, the reader should understand that references to percent changes in MAP are intended to include reference to such a change as would be corrected for temperature change so as to properly reflect a percentage change in mass air flow.

Figure 2:
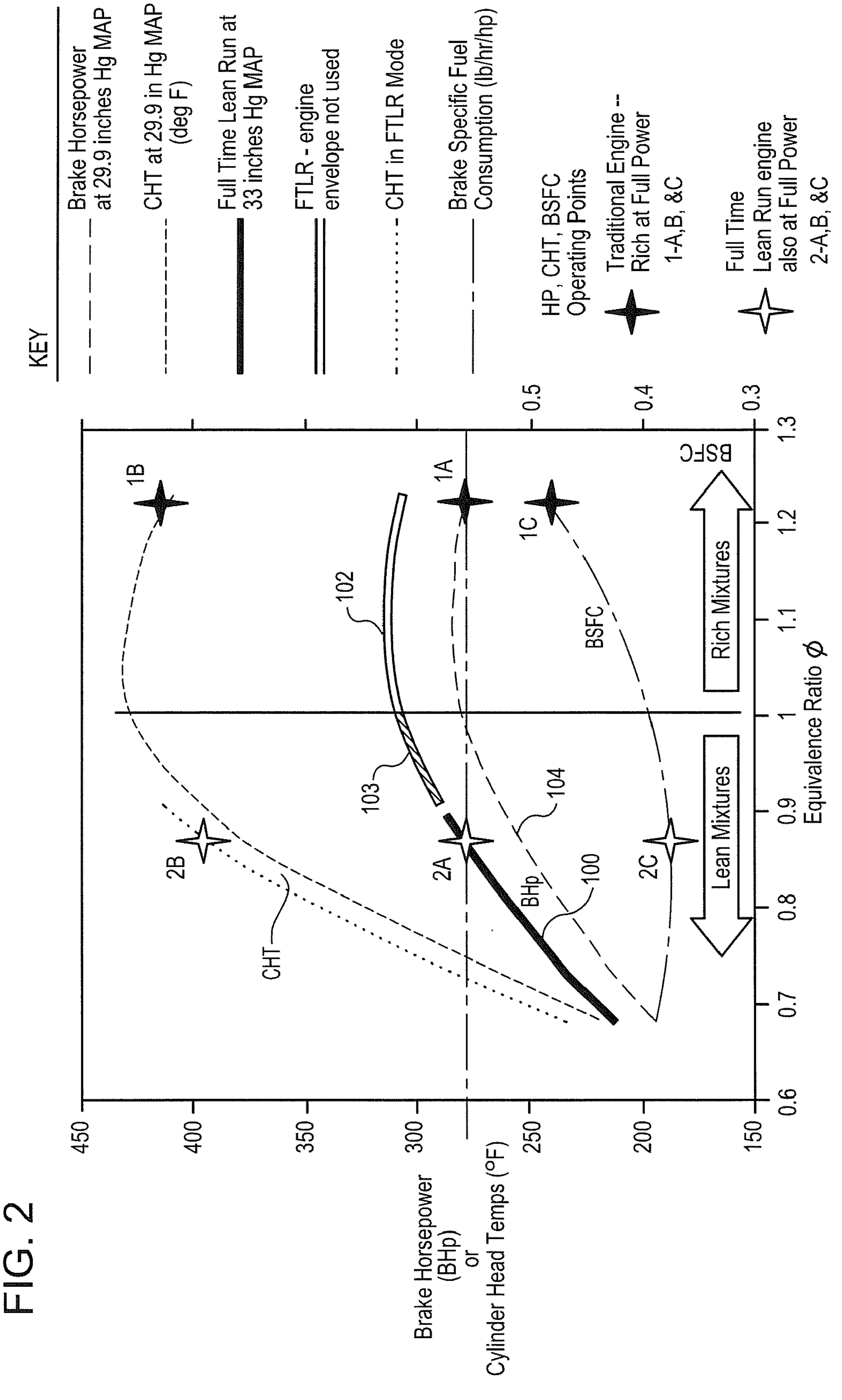
FIG. 2 is a graphical representation of key operating parameters for exemplary new engine configurations provided by way of the present invention.

Attention is directed to FIG. 2, which provides a graphical representation of key operating parameters for exemplary new engine configuration according to the design and operating techniques taught herein. First, curve 100 identifies the operating engine BHP for an engine designed and operated for full time lean burn operation as described and taught herein. Curve portion 102 defines a portion of a potential operating curve for such an engine that would not be used for an engine if designed and operated for full time lean burn operation at high power settings as described and taught herein. Attention is further directed to curve portion 103 which corresponds to values of ϕ from approximately 0.9 to 1.0. Such area would not practically be generally used for the high power portion of FTLR engine operation as described herein. However, in certain unique situations that might warrant operation in that range of AFR's at high power, a FTLR engine could be provided using the teachings herein. Further, for AFRs encompassing a value of ϕ from about 0.9 to about 1.0, engine operation with those mixture settings can be usefully employed at lower power settings, and in particular during long low power descents or low power cruise flight, wherein the engine might be operated with the power a level of from 40 to 65% of its maximum rated power. The benefit of such operation would include keeping the CHT somewhat higher in a portion of the flight when the aircraft and its air cooled engine may be descending and traveling at high speed which might otherwise cause excessively cool engine cylinder head temperatures. Next, curve 104 identifies an operating engine BHP for a prior art engine as described above in relation to FIG. 1. The BHP for both curve 100 and curve 104 is noted on the vertical Y-axis on the left hand side of the graph. In curve 100, the engine horsepower output is provided under the condition in which the air flow to the engine has been increased, here by way of increasing the engine manifold absolute pressure (MAP) by approximately 10 percent as compared to the output of a prior art engine configuration as depicted in curve 104. Thus, as a result of the increased MAP, the operating BHP represented by curve 100 represents a mass airflow that is approximately 10 percent greater than for the lower curve 104.

Further advantages of engine operation in a full time lean run configuration, as compared with prior art conventional engine operating practices, can be further appreciated from FIG. 2 by inspection and comparison of the proposed full time lean run configuration, as compared to conventional practice including:

(a) at point 1A (showing BHP of prior art engine) as compared to point 2A (showing BHP of full time lean run engine);

(b) at point 1B (showing CHT of prior art engine) as compared to 2B (showing CHT of full time lean run engine); and (c) at point 10 (showing BSFC of prior art engine) as compared to 2C (showing BSFC of full time lean run engine).

By comparison of BHP at points 1A and 2A it can be appreciated that in a full time lean run engine, set up and operated as taught herein, the maximum horsepower provided for critical operations, such as takeoff, may be provided comparable to that, if not equal or more, of the maximum horsepower provided by the prior art engine configuration.

However, by comparison of CHT at points 1B and 2B, it can be appreciated that in a full time lean run engine, the CHT for maximum horsepower operation is changed in a highly favorable and useful manner. That is, point 2B reveals that in a full time lean run engine, the engine CHT is reduced in the range of about 20° F. to 30° F. from the temperature for point 1B.

Moreover, by comparison of the BSFC at points 10 and 2C, it can be appreciated that in an embodiment, the fuel consumption of the full time lean run engine may be reduced by approximately 30 percent (at approximately the same BHP) compared to the fuel consumption of the prior art engine, as shown at point 10.

A full time lean run ("FTLR") engine provides many advantages over presently available engines. Frequently, there are critical regulatory certification barriers or adverse operating limitations that are defined by the CHT limitations encountered, given the temperatures encountered in view of metallurgy utilized in engine construction. Consequently, detailed evaluation of CHTs for an engine, during full power climb cooling testing, is required for regulatory approval. Thus, a FTLR engine design provides increased cooling margins, without sacrificing available horsepower in an engine of given displacement. Thus, in an embodiment, a FTLR engine should provide at least the same performance as that of prior art engines, but the FTLR engine provides an advantage of lower CHT and lower BSFC and reduced CO and $CO_2$ emissions.

Further, the FTLR engine design provides the solution to certain of such regulatory barriers and CHT operating limitations. That is because in some prior art engines, the performance in terms of climb rate for these primarily air cooled engines is limited by the CHT margin available during operation. In addition, due to the improved cylinder cooling, a FTLR engine, with cooler CHTs, can be provided by retrofitting certain prior art engines and provide added horsepower over their previous maximum rated horsepower limitations, by taking advantage of the increased cylinder head cooling margins afforded by FTLR operation.

Normally aspirated engines do not operate with MAPs above the ambient pressure, which at sea level and standard conditions is approximately 29.92 inches of mercury ("Hg"). Thus, in order to provide increased MAP so as to restore power when operating in a FTLR operational mode, in an embodiment, FTLR engines may utilize compressors to compress the inlet air supplied to the cylinders. Such compressors may be of an engine driven configuration, commonly known as superchargers, or may be of an exhaust gas driven configuration, commonly known as turbochargers.

While both superchargers and turbochargers are widely known and used in aviation engines, especially for the purpose of providing full power takeoff configurations that involve setting the engine MAP above ambient pressure (if not well above), such devices normally involve use of highly enriched AFRs in an attempt to provide engine cooling during high power operations. Among other reasons, the maximum instantaneous internal combustion gas pressures are reduced by the effects of the richer AFR which slows down the burn rate of the air-fuel mixture. However, such modes of operation result in greatly increased BSFC levels ranging from more than 0.50 lb/hr/hp of fuel up to levels of about 0.74 lb/hr/hp of fuel consumption, which is a BSFC level "off the chart" compared even to those prior art engines discussed in relation to FIG. 1. Such prior art general aviation engine operating configurations have been plagued for many years by these excessive BSFC and high CHT problems, as well as increased wear and tear resulting therefrom, especially as regards the high CHTs commonly encountered in prior art engines using some sort of inlet air compression device.

What has not been recognized and applied, prior to the present invention, is that certain prior art engines utilizing inlet air compression devices may be modified, by way of a different initial set up, or by rework, retrofit, and/or overhaul, depending upon the new or existing engine configuration, to operate in a FTLR normal operational mode. A method to modify an engine to provide FTLR normal operations may involve changing the output set point for the compressor, in order to deliver from about 10 to about 15 percent additional MAP output to the engine cylinders. Further, the engine fuel flow and mixture controls are then reset, to provide lean AFRs, so that the modified engine normally operates at an equivalence ratio $\phi$ of less than 1.0. In an embodiment, the mixture controls may be reset so that the engine operates at an equivalence ratio $\phi$ of from about 0.8 to about 0.9. In a FLTR engine, normal operational mode provides takeoff power, climb power, and cruise power, all while maintaining AFRs with an equivalence ratio less than 1.0. Thus, fuel economy of lean AFR operation can be achieved during full power operation such as in the critical takeoff and climb portions of flight, as well as during routine enroute cruise portions of flight. Moreover, since the engine is operating with a lean AFR, hydrocarbons in the fuel are practically fully combusted to produce carbon dioxide and water vapor, and emissions of unburned or partially burned hydrocarbons such as carbon monoxide are virtually eliminated, and thus are reduced below levels of concern with respect to human health (eliminating hazards to pilot and passengers) and to the environment (below applicable regulatory limits). Further, the emission of carbon dioxide is reduced in the lengthy takeoff and climb phase of flight roughly in proportion to the reduction in the BSFC of the present invention as compared to the prior art.

Heretofore, general aviation engine operations involve use of very rich AFR mixture settings during the takeoff and climb portions of a flight, and then an adjustment to either a "less rich" or "slightly lean" AFR during the cruise portion of the flight. That is, during a cruise portion of a flight, the pilot may adjust the engine to run at an exhaust gas temperature ("EGT") that is slightly rich of the exhaust gas temperature at the peak EGT or slightly lean of peak EGT, depending on the pilot's training, equipment and instruments available to the pilot, and the then current engine performance. Note that the peak EGT normally represents the approximate mixture condition at which the engine is burning a stoichiometric AFR mixture. Upon descent, during preparation for the approach and landing phase of flight, the mixture is again adjusted to a rich AFR condition, to accommodate a possible missed approach and "go-around" of the aircraft, should it become necessary to abort the initial landing attempt and utilize maximum rated horsepower of the engine during the ensuing climb back to a safe altitude.

In contrast to the just described workload for the pilot to attend to mixture adjustment, the use of FTLR engine operation provides an engine normal operating mode wherein the engine runs full time in the lean AFR condition. Consequently, one advantage of the FTLR engine is that pilot workload is substantially reduced, since the FTLR engine eliminates the need to intensively monitor, understand, and intelligently manage the engine AFR mixture condition for varying conditions or phases of the flight.

In one embodiment, FTLR engine designs and configurations as taught herein, may be used to either modify existing engines, or to replace existing engines, in twin engine turbocharged general aviation aircraft. Some examples of such aircraft are Cessna 340, and the Cessna 414, both made by the Cessna Aircraft Company of Wichita, Kans. In another embodiment, Beechcraft Barron model turbocharged twin engine aircraft (originally developed by Beech Aircraft Corporation and now provided by the Beechcraft Division of Hawker Beechcraft Corporation), which in many variations utilized turbocharged Continental Teledyne model TSIO-520 engines, would be a suitable candidate for replacement of existing engines, or for modification of existing engines, by using a FTLR engine configuration as taught herein.

In an embodiment, those existing Cessna model 200 series, and model 310, 320, 411, & 414 series aircraft equipped with Teledyne Continental Motors TSIO-520 series engines can, in accordance with the teachings herein, be modified so that (a) the compression ratio may be changed from approximately 7.5:1 to approximately 8.5:1 and, (b) by increasing the mass air flow by increasing the MAP, such engines may then be operated in the FTLR mode. Such aircraft and their associated engines can also have their displacement increased from approximately 520 cubic inches to approximately 550 cubic inches, using readily available components, and thereby further augment the mass air flow through those engines to allow FTLR engine operation as taught herein. In such case, as a variation from the combination first mentioned in this paragraph, one might chose not to increase the compression ratio of such increased displacement engines, yet still usefully apply FTLR as taught herein. Aircraft and their associated engines as are included within the scope of this embodiment can, in accordance with the teachings herein, also be further modified with electronic ignition systems that replace existing traditional fixed timing magneto systems, so as to provide variable timing which is responsive to environmental conditions and the engine operating parameters so as to further enhance the FTLR operation of those aircraft and their associated engines.

In an embodiment, those existing twin engine Cessna model 310, 320, 340, 411, 414 series aircraft equipped with Teledyne Continental Motors TSIO-520 series engines can, in accordance with the teachings herein, be modified so that the compression ratio is changed from approximately 7.5:1 to approximately 8.5:1 and, by increasing the mass air flow by increasing the MAP, such engines may then be operated in the FTLR mode. Such aircraft and their associated engines can also, as taught herein, have their displacement increased from approximately 520 cubic inches to approximately 550 cubic inches, using readily available components, and thereby further augment the mass air flow through those engines to allow FTLR engine operation as taught herein. Such embodiment will be further enhanced by making provision for a stand-by mixture mode, whereby during an emergency when one engine has failed, the remaining engine, operating in the FTLR normal mode, could be immediately changed and operated in a rich AFR mode but continuing to use the additional mass air flow as taught herein, so that the horsepower on the remaining engine could be temporarily increased by as much as 8 to 10% to thereby usefully improve the safety of the aircraft operation after an in-flight emergency engine shut down of one of the two engines. In some embodiments, not all of the elements that are disclosed will be necessary to usefully employ the teachings hereof. As an example, in the embodiment presently under discussion, one might chose not to increase the compression ratio of such engines and still be able to usefully apply FTLR as taught herein. Aircraft and their associated engines as are included within the scope of this embodiment can, in accordance with the teachings herein, also be further modified with electronic ignition systems that replace existing traditional fixed timing magneto systems so as to provide variable timing which is responsive to environmental conditions and the engine operating parameters so as to further enhance the FTLR operation of those aircraft and their associated engines.

In yet another embodiment, the existing and future fleet of Cirrus Design model SR 22 aircraft which are equipped with turbo chargers can be converted in accord with the teachings herein so that they are transformed (a) from a current, existing configuration in which at full power they operate at 310 Hp at wide open throttle ("WOT") and approximately 29.6" Hg and 2700 RPM with approximately 203 lb/hour of fuel at a BSFC of approximately 0.66 lbs/hr/Hp, to (b) a retrofitted configuration in which such aircraft would thereafter operate as FTLR aircraft with a full power configuration of 310 Hp at wide open throttle and approximately 33" Hg and 2700 RPM with a fuel flow of approximately 119 lb/hour of fuel flow and a BSFC of approximately 0.385 lbs/hr/Hp. Aircraft and their associated engines as included within the scope of this embodiment can, in accordance with the teachings set forth herein, also be further modified with electronic ignition systems that replace existing traditional fixed timing magneto systems so as to provide variable timing which is responsive to environmental conditions and the engine operating parameters so as to further enhance the FTLR operation of those aircraft and their associated engines.

In another embodiment, the existing fleet of Beechcraft aircraft that are equipped with turbochargers or which may have been modified with turbonormalizers or which may, in the future be equipped with turbochargers, can be converted according to the teachings herein so that they are transformed (a) from a configuration in which at full power they operate at 300 Hp at wide open throttle (WOT) and approximately 29.6" Hg and 2700 RPM and approximately 203 lb/hour of fuel at a BSFC of approximately 0.68, to (b) a configuration after the application of the teachings hereof, wherein such aircraft thereafter operate as FTLR aircraft with a full power configuration of 300 Hp at wide open throttle and approximately 33" Hg and 2700 RPM and a fuel flow of approximately 116 lb/hour of fuel flow and with a BSFC of approximately 0.385.lbs/hr/Hp. Aircraft and their associated engines as are included within the scope of this embodiment can, in accordance with the teachings herein, also be further modified with electronic ignition systems that replace existing traditional fixed timing magneto systems so as to provide variable timing which is responsive to environmental conditions and the engine operating parameters so as to further enhance the FTLR operation of those aircraft and their associated engines.

In yet another embodiment, the existing fleet of Cessna model 185, 205, 206, 210 aircraft, and the "T" variations of each such model aircraft, that are equipped with turbochargers or which may have been modified with turbochargers, can be converted according to the teachings herein so that they are transformed (a) from a configuration in which at full power they operate at their presently approved full power configuration of MAP, RPM, and fuel flow, (b) to a configuration after the application of the teachings herein in which such aircraft would thereafter operate as FTLR aircraft with a full power configuration of 300 Hp at wide open throttle and approximately 33" Hg and 2700 RPM and a fuel flow of approximately 115 lb/hour of fuel flow and with a BSFC of ~0.385 lbs/hr/Hp. This embodiment may be further enhanced by converting those aircraft engines so that the compression ratio of the engines is approximately 8.5:1 rather than some lower value as may presently exist on some of the aircraft engines otherwise included within the teachings herein for this embodiment. Aircraft and their associated engines as are included within the scope of this embodiment can also be further modified with electronic ignition systems that replace existing traditional fixed timing magneto systems so as to provide variable timing which is responsive to environmental conditions and the engine operating parameters so as to further enhance the FTLR operation of those aircraft and their associated engines.

Those of ordinary skill in the art and to whom this disclosure is directed will recognize that there are a multitude of general aviation aircraft models manufactured the last 50 years by Cessna, Beechcraft, Piper Aircraft, Robinson Helicopter, and other original equipment manufactures which may be modified in accordance with the teachings herein to operate in an FTLR configuration. Many of these aircraft models continued to be manufactured and such future aircraft may benefit from the teachings of the present disclosure.

More generally, various single engine aircraft that might be fitted with one or two turbochargers, could benefit by retrofit with FTLR engines, in accord with the teachings herein.

In yet another embodiment, single engine aircraft that have turbochargers, such as in some Cessna T-210 Centurions, or other aircraft such as the Cirrus SR 22 fitted with a turbonormalizing system, or certain models of Mooney aircraft, can be modified and adapted for, or slightly redesigned and originally manufactured and sold with, the use of FTLR engines. In the "existing" turbocharger engine models, the modification of existing engines, or setup of new engines, would include providing for control of the MAP at a point from about 10 to 15 percent above their MAP set points as prescribed and certified when the turbochargers are used in prior art rich AFR engine configurations. Additionally, changes to the engine driven fuel pump settings and the associated fuel injector sizing would be made to reduce the maximum available fuel flow to levels that provide for engine operation with stoichiometric lean mixtures, i.e., with equivalence ratios $\phi$ of less than 1.0. Further, in an embodiment, such engines would be adjusted so that the FTLR engine will operate at high power with fuel flows that would not exceed an equivalence ratio $\phi$ of approximately 0.9 or thereabouts. In an embodiment an equivalence ratio $\phi$ of between about 0.8 and about 0.9 may be provided.

In order to take full advantage of FTLR engine operation, aircraft engines must be set up to run in a satisfactorily smooth manner but with AFRs as lean as feasible. Although those of ordinary skill in the art have historically been repeatedly unable to achieve satisfactory smooth engine operation under lean conditions in most general aviation aircraft, the various mysterious constraints that have prevented lean AFR aircraft engine operations have largely been eliminated by recent engineering developments, such as those described in U.S. Pat. No. 5,941,222, issued Aug. 24, 1999, and entitled Optimizing the Efficiency of an Internal Combustion Engine, the disclosure of which is incorporated herein in its entirety by this reference. Generally, many prior art attempts at lean operation in general aviation aircraft engines were found impossible due to cylinder-to-cylinder variation in AFR. Such imbalances between individual cylinders meant that such cylinders reached a peak EGT at different total engine fuel flow rates. That produced a condition whereby at any given total engine fuel flow rate the individual cylinders were producing different horsepower values when the mixture was adjusted so that the engine would operate with a lean AFR. When using rich AFR settings, such an imbalanced condition had been generally insignificant because the slope of the corresponding brake horsepower curve is typically quite flat with respect to changes in mixture in such operating range. However, when operating with lean AFR mixtures, such imbalanced conditions are significant because the slope of the corresponding brake horsepower curve, with respect to changes in mixture, typically drops off steeply in such operating ranges, and any variation in cylinder to cylinder AFR's results in a corresponding variation in cylinder to cylinder power pulses delivered to the crankshaft. In any event, by exploiting the teachings found in the above mentioned patent, consistently smooth engine operation is provided at very lean AFR's and corresponding values of $\phi$ in the range between about 0.8 and about 0.9 across a broad range of engine RPM and MAP settings. This resulting smooth engine operation is accomplished, by balancing the cylinder-to-cylinder air/fuel ratios and making each cylinder operate in a more consistent manner with respect to the other cylinders and their combustion event characteristics. Using those recent engineering developments and the teachings herein, a selected design range and the precise settings for operation with respect to MAP and lean AFRs, as are required to provide a practically useful aircraft or rotorcraft for the pilot owner/operator, and to meet the multitude of various regulatory certification requirements, may be determined by routine experiment and testing by those of ordinary skill in the art and to whom this disclosure is directed. Given the art noted and the teachings herein, those persons with such skill should be able to achieve the overall final characteristics for a suitable FTLR engine configuration as described herein, as suitable for a particular airframe, without undue experimentation.

Also, prior art general aviation aircraft piston engine technology has generally employed simple magneto technology to provide engine spark ignition. Such old technology is normally limited in its usefulness to a single point of ignition timing at a fixed number of degrees before piston top dead center ("BTDC"). Use of such technology in aviation engines has continued in the face of great advances in ignition systems in engines used elsewhere, and particularly in automobiles, largely due to its simplicity, redundant capabilities, desirable and predictable failure modes, and due to the historic observation that aircraft and similar high duty cycle engines tend to spend a very high percentage of their operating lives at single design operating points, i.e., cruise power configurations. However, the ongoing development of electronic ignition technology can now provide affordable and reliable variable ignition timing for aircraft piston engines. The range of usefulness of FTLR engines can be further extended, and in some aspects, substantially improved, by the use of such electronic ignition technology. In an embodiment, an appropriate and automatically adjusted spark ignition timing during critical high power portions of a flight profile may mitigate high internal cylinder pressures, as well as reduce CHTs, without materially compromising BHP output from the FTLR engine. For example, in an embodiment, a variable sparking ignition timing system is provided, and when CHTs approach an undesirable range, or near and unacceptable range, then spark timing may be temporarily retarded from about 2 to about 4 degrees. By changing such spark timing when operating a FTLR engine, cylinder overpressure, and undesirable or unacceptably high CHTs, are advantageously avoided. For example, empirical data from such changes in ignition spark timing reveal that a change from 22 degrees BTDC of piston travel to 20 degrees BTDC can reduce the magnitude of the peak internal cylinder pressures by as much as 8 to 12%. The peak instantaneous internal cylinder pressure ("PICP") is the critical combustion parameter with respect to the loads imposed on the cylinder heads, rings, spark plugs, valves, crank shaft, and all of their associated bearings and related wear components. Such reductions in PICP result in reductions in the CHTs by as much as 20 to 30 degrees F. However, such reductions in PICP over the range described herein, do not cause a similar large reduction in the mean internal cylinder pressures, often referred to as the Brake Mean Effective Pressure (BMEP) and which later value is directly related to engine torque.

Further, use of engine cylinder specific fuel delivery technology, such as sequential port injection, or direct cylinder injection, may be combined with FTLR engines to still further improve the utility of such an engine. The use of direct cylinder injection or sequential port fuel injection has the theoretical ability to further improve upon (as compared to even the results obtainable by implementing the teachings described in the previously noted U.S. Pat. No. 5,941,222, entitled Optimizing the Efficiency of an Internal Combustion Engine) the uniformity of cylinder to cylinder and cycle to cycle engine combustion events. While such improvements may be marginal, and come at some expense in cost and mechanical complexity, they may still be usefully implemented with the present FTLR engine invention to enhance further its ability to operate smoothly at very lean mixture settings.

Example 1

A FTLR engine may be provided by modifying many engines presently in the existing fleet of general aviation spark ignition engines. To provide a FTLR engine, and further, to optimize the operation of a FTLR engine, modifications may include improved fuel metering and delivery, supercharging or turbocharging, improved ignition, or increasing displacement volume of an engine. Table I compares, in detail, the improvement anticipated to be achievable in an embodiment using a FTLR engine configuration.

TABLE I

| | MAP | RPM | Fuel Flow (lb/hr) | A/F Ratio | Peak Internal Cylinder Pressures | Brake Specific Fuel Consumption (lbs/hr/hp) | BHp |
|---|---|---|---|---|---|---|---|
| Prior Art | 29.0 | 2700 | 164 | ~11.0:1 | ~950 PSI | ~0.547 | ~300 |
| FTLR Engine Operation | 33.0 | 2700 | 117 | ~17.0:1 | ~900 PSI | ~0.385 | ~300 |

(Note: Values are approximate, based on a combination of both theory and observation, and are subject to refinement based on further testing.)

Example 2

A FTLR engine can be provided based on modifications of, or the rebuilding or replacement of an existing engine, and combined with further mechanical modifications, including turbochargers, improved fuel metering and mixture control, and improved ignition systems, to take further advantage of FTLR engine operation. An example of the results for one embodiment using a FTLR engine is illustrated in Table II.

TABLE II

| | MAP | RPM | Displacement | Fuel Flow (lb/hr) | Compression Ratio | A/F Ratio | Peak Internal Cylinder Pressure | BSFC (lbs/hr/hp) | BHP |
|---|---|---|---|---|---|---|---|---|---|
| Prior Art | 38 | 2700 | 520 c.i. | 234 | 7.5:1 | ~8.4:1 | ~950-1050 PSI | ~0.70 | ~335 |
| FTLR Engine Operation | ~41 | 2700 | 550 c.i. | 129 | 7.5:1 | ~17.4:1 | ~900-1050 PSI | ~0.385 | ~335 |

(Note: Values are approximate based on both observation and theory, and are subject to refinement based on further testing.)

In an embodiment, the engine displacement may be increased in the course of providing a FTLR engine, as noted above in Table II. The increased displacement increases the air mass flow through the engine, reducing the magnitude of the increase in MAP required to obtain the desired overall increase in mass air flow through the engine. In this regard, engine parts are available for an entire class of existing 520 cubic inch displacement aircraft engines for conversion of such engines to a 550 cubic inch displacement. Such changes may be accomplished by increasing the stroke of such engines by use of a different crankshaft, different connecting rods, and different pistons. Such modification results in the increase of the mass of air that can be processed by the engine over a unit of time. Such increased airflow provides a way to increase the BHP of the rebuilt engine while minimizing the amount of additional MAP required to provide a FTLR engine.

Example 3

As a further example, the existing fleet of over 700 Cirrus Model SR 22 aircraft have been equipped with turbo-charging systems so that they are capable of maintaining sea level manifold pressure over the entire altitude operating range of the aircraft, from sea level to 25,000 feet. That aircraft is equipped with an engine identified as a Teledyne Continental IO-550N engine, with 550 cubic inches of displacement. That engine is claimed to normally produce 310 BHP at sea level and standard atmospheric reference conditions of 29.92 inches of mercury barometric pressure and 59° F. outside air temperature. When so operated, the engine gages will typically show manifold absolute pressure (MAP) of approximately 28.5" to 29" Hg at full rated 2700 RPM at sea level. The comparable normally aspirated engine looses power roughly in proportion to the change in air density when the aircraft is flown to altitude. When equipped with the above noted optional turbo-charging system, the engine continues to produce the same 310 Hp at an indicated MAP of approximately 29.6", however, it is able to roughly maintain that same 310 BHP when flown to very high altitudes, where the air density is much reduced.

Figure 3:
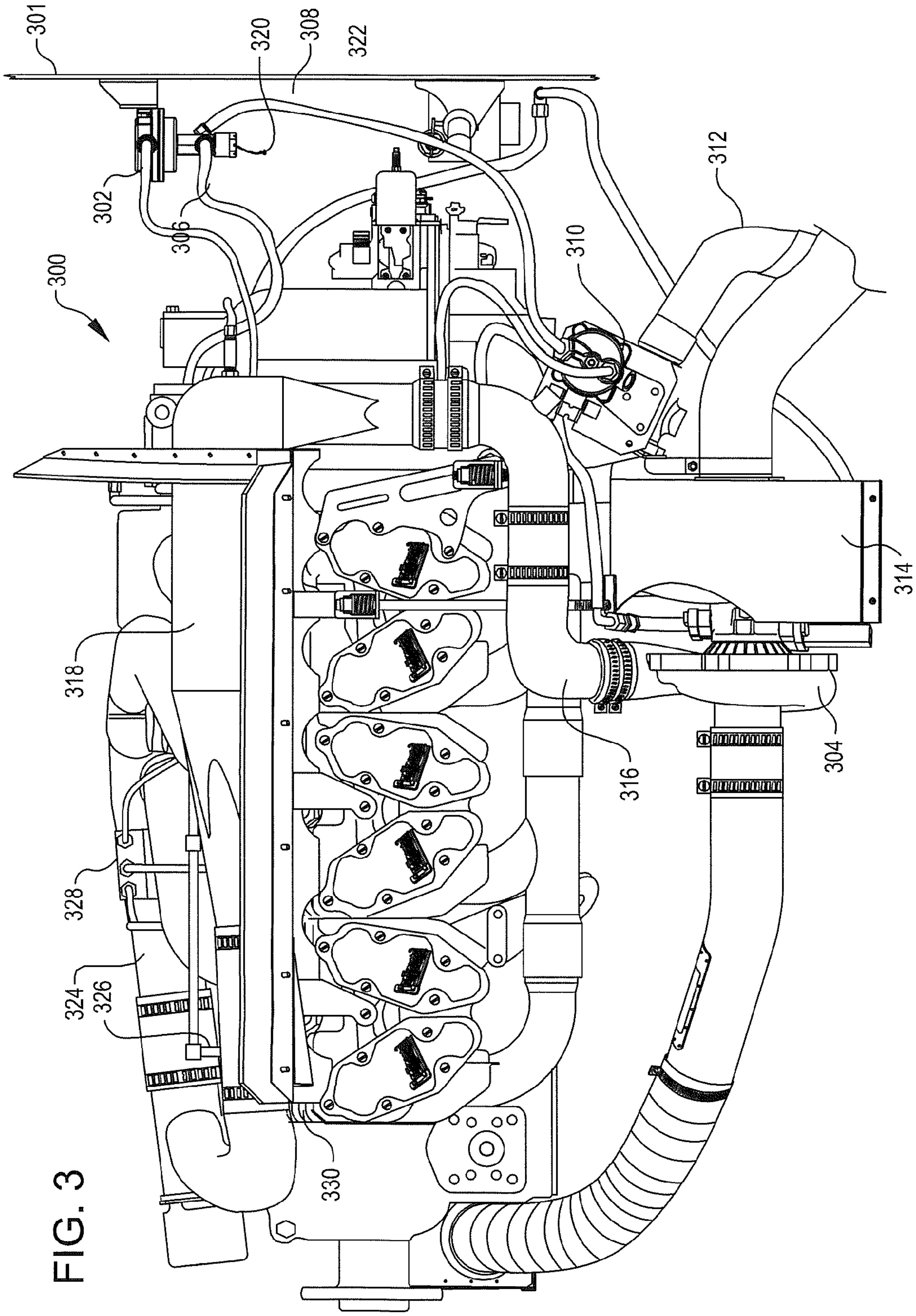
FIG. 3 provides a side view of an exemplary aircraft engine configured for operation in accord with the teachings hereof, showing the engine cylinders, fuel pump, fuel manifold valve, turbocharger, and manifold pressure controller.

The Cirrus Model SR 22 aircraft is provided with an engine 300 mounted forward of firewall 301 as shown in FIG. 3.

Engine 300 is provided with a turbocharging system that employs three primary components to control the output of exhaust gas driven compressors. A traditional pneumatic-hydro-mechanical controller 302 works as a pressure controller for the over all system. This pressure controller 302 senses the output pressure from the exhaust gas driven compressor 304. The output pressure from compressor 304, commonly referred to as upper deck pressure ("UDP") is routed to the pressure controller 302 through a sense line 306. A sealed enclosure housing pressure controller 302 contains an internal sealed aneroid type bellows (not shown) which expands and contracts with changes in UDP. The internal movement of the aneroid bellows activates a small oil valve which vents in a controlled manner engine oil under pressure in line 308 which is coming from an hydraulic type wastegate actuator 310 so as to regulate the extension of the hydraulic actuator.

The hydraulic wastegate actuator 310 uses low pressure engine oil to manipulate the position of the third component, which is a butterfly valve (not shown) inserted into an exhaust bypass 312 which routes excess exhaust gas around the turbine section 314 of the exhaust gas driven compressor 304 so as to allow control of the speed of the compressor 304 (302), and thus controlling the mass air flow that is discharged from the compressor 304 into the inlet manifold 316 and through the air-to-air heat exchanger 318 then on to the engine throttle unit 324 (details not shown).

In practice, there is a "set screw" 320 arrangement in the pressure controller 302 that adjusts the set point of the internal aneroid type bellows noted above. Proper adjustment of the set screw 320 allows the system to be configured so that there is a repeatable maximum amount of pressure that is discharged from the compressor. In order to modify the existing engine and to provide a FTLR engine instead, the set screw 320 in the aneroid bellows control mechanism should be adjusted so that the engine pressure discharged from the compressor 304 is increased in pressure in an amount of about 10% to about 15% above its originally specified operational pressure configuration in an existing prior art configuration. The exact amount of the increase in pressure depends upon the efficiency of the particular compressor and any associated air-to-air heat exchanger. The ultimate determination may be arrived at by routine test and measurement, with an increase in engine mass airflow of approximately 10 to 15% being the object of the adjustment to the pressure controller (301).

Figure 4:
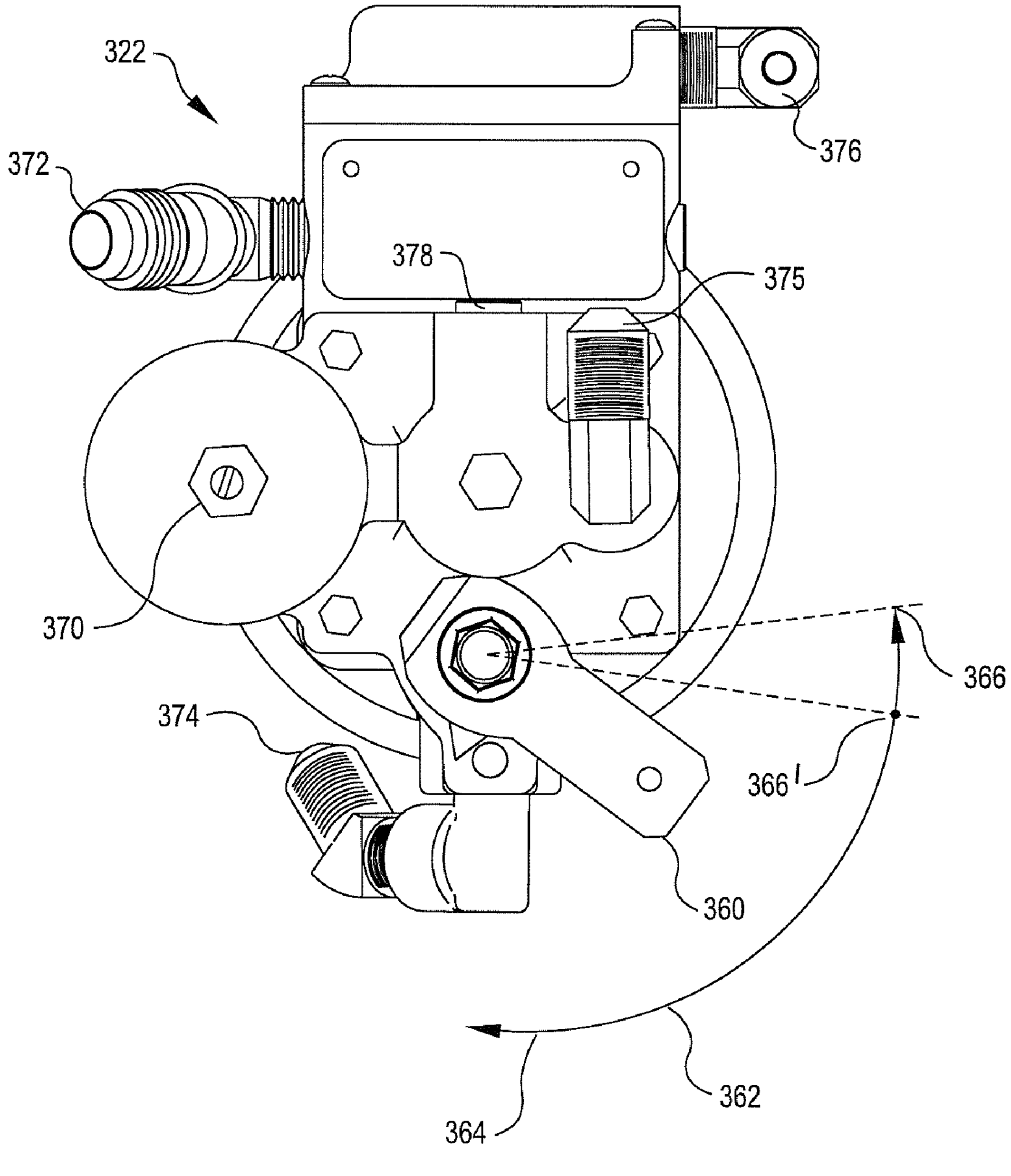
FIG. 4 provides a front view of a fuel pump, showing where settings for providing operational control of the engine in accord with the teachings hereof may be arranged.
Figure 5:
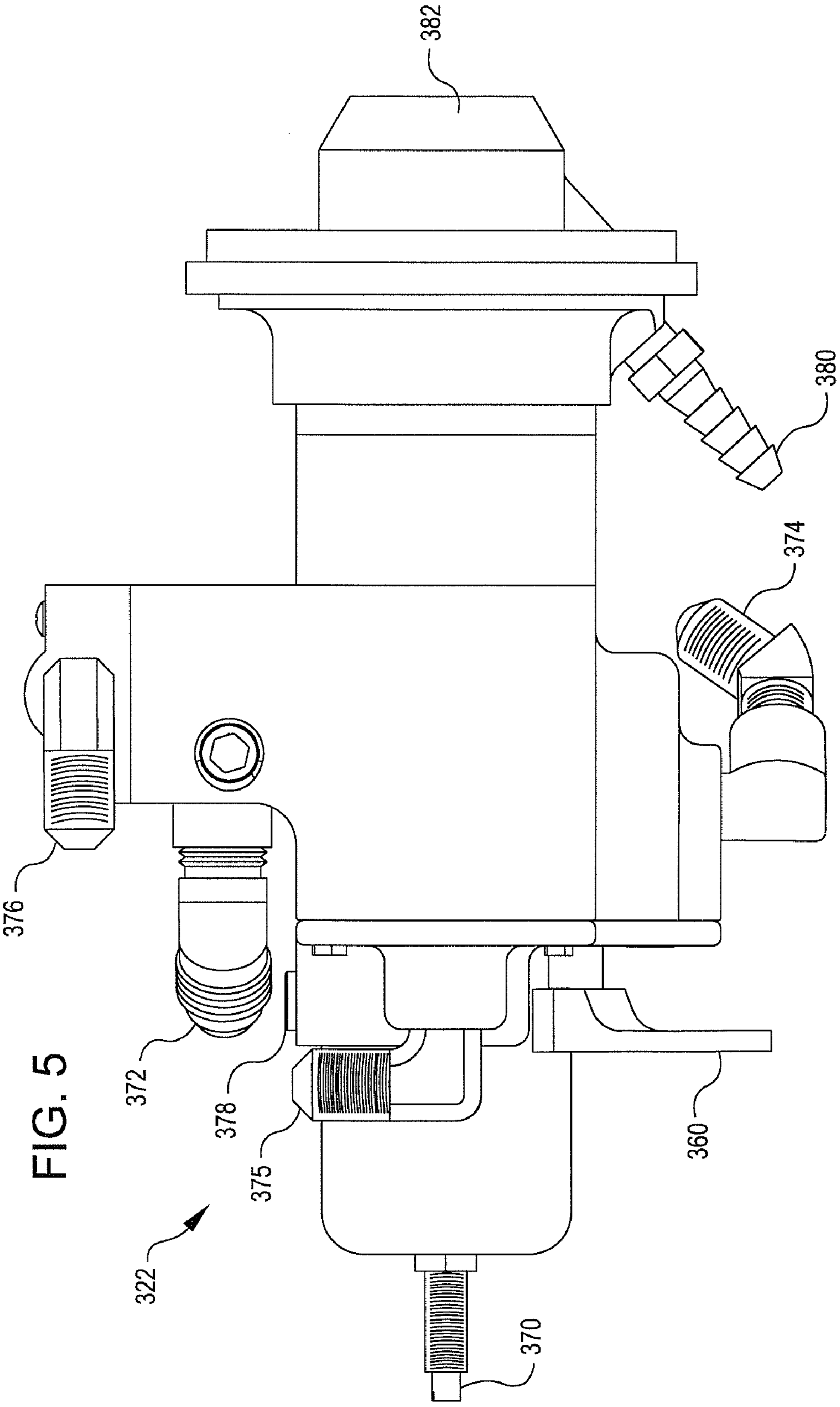
FIG. 5 provides a side view of a fuel pump as just shown in FIG. 4 above, but now showing the location of the various control adjustments parts and mechanisms used for adjustment of the fuel pump to set up an aircraft engine for full time lean run operations.

Attention is now directed to FIGS. 4 and 5, where the details for exemplary embodiment of the engine driven fuel pump 322 are depicted. In addition to making the noted adjustment to the turbo charger output pressure controller, an adjustment should be made to the fuel flow from the engine driven fuel pump 322 in order to provide a fuel flow quantity that will result in a stoichiometric lean mixture. In this manner, the horsepower of the engine may be maintained in a lean AFR operating regime (see typical example as explained above in relation to FIG. 2) by limiting the fuel flow to the engine 300. In such a modified FTLR configuration, the engine 300 then produces 310 BHp, the same horsepower as provided in the original rich fuel-air operational configuration. However, in the FTLR normal operational mode, the engine runs with a stoichiometric lean mixture, rather than with a rich mixture, i.e. under all normal operating modes, hence the equivalence ratio is less than one. This relationship of the BHp under FTLR conditions and at prior art rich AFR mixture conditions is of course analogous to the engine BHp relationships depicted in FIG. 2.

The adjustment of the fuel system may be accomplished in various ways. Attention is directed to FIGS. 3, 4, and 5, where certain details of the fuel system of the modified IO-550 N engine are provided. The fuel system has four primary components. First, an engine driven internal rotary vane fuel pump 322 is provided. Second, the fuel pump 322 has a "mixture" control lever 360 which is pilot adjusted along an arc noted with reference arrow 362 in a lean direction toward idle cutoff mixture as noted by reference 364, or in a full rich mixture direction as noted by reference arrow 366, through a control (not shown) located in the cockpit. Third, a "throttle" 324 is provided, with a fuel metering device (not shown) that varies the amount of fuel put to engine 300 as a throttle plate (not shown) of throttle 324 is opened and closed, so as to roughly proportion fuel with air flow through the throttle 324. Fourth, a fuel divider 328 is coupled to individual fuel injectors 326, located at each cylinder 330 to supply fuel to an intake port at each cylinder. Thus, in a six cylinder engine 330 as described in reference to FIG. 3, six injectors 326 are provided.

Other methods might be utilized by one skilled in the art of internal combustion fuel management, and to whom this specification is directed, to control the fuel supply system. In one embodiment, the pilot operated mixture control "stop" limit or angular "travel range" as indicated by reference arrow 362 may be adjusted and constrained such as to a point indicated by reference numeral 366', so that when the mixture control is advanced to a position which delivers the largest amount of fuel flow at full power, the actual fuel flow is limited to the desired maximum flow (in the exemplary engine configuration as just set forth above to about 117 lb/hour) so as to effectively limit engine horsepower to no more than its originally rated 300 BHP. As defined by the US FAA, and as used herein, the term "rated" is more precisely known as the "rated maximum continuous power", and means the maximum BHP that is provided within the engine operating limitations established by the regulatory authorities and approved for unrestricted periods of use. As is evident by examination of FIG. 2, the same horsepower output can be provided even though the engine, as modified, runs in a FTLR configuration, although the engine manifold absolute pressure is higher under FTLR conditions than was the case when the engine was in its originally specified "stock" condition.

Also, other methods might be utilized to make a suitable adjustment and thus provide an equivalent end point in fuel flow quantity. Such alternate embodiments may include A) adjusting an internal metering adjustment integral to the engine driven fuel pump, (such as by adjustment to set screw 370 shown in FIG. 4); B) re-defining the metering orifice diameter at the metering orifice at the throttle control; or C) adjusting the size of the metering orifice at each of the fuel injectors. These devices and methods may be used in various combinations, and other devices and methods may be utilized, separately or in combination with those just mentioned, within the scope and teaching of the provision of a FTLR engine as described herein. Further, it should be recognized that exemplary fuel pump 322 is shown in FIGS. 4 and 5, with conventional components such as fuel inlet 372, fuel outlet 374 from the fuel pump 322 to throttle 324 metering device, a port for UDP 375 used by the internal components of the fuel pump to assist in modulating proper fuel flow levels, fuel vapor return 376, another reference port for UDP 378 from compressor 304, drain 380, drive shaft 382, and internal rotary vane pump (not shown). Various fuel pumps of other configurations and differing in design and operational architecture may still be appropriately adjusted to achieve the advantages of a FTLR engine operation configuration as taught herein.

Those of ordinary skill in the art and to whom this disclosure is directed will recognize that the fuel systems in general aviation piston engines are configured in a variety of different mechanical arrangements. Some of these systems utilize an engine driven rotary vane fuel pump. Other systems employ a wobble type fuel pump. Still other systems use gravity feed to carburetors. The engines and aircraft which are most readily adapted to modification, or for use in new production will use one of the former two types of fuel pumps, and will have associated therewith a mechanical device with which fuel metering through an variable orifice is accomplished and which is typically, but not exclusively, arranged as a by-pass so that excess fuel is either routed back to the inlet of the fuel pump or is routed back to the aircraft fuel tank. In some arrangements, the pump may incorporate a vapor separator that is designed to help separate vapor and to keep vapor from entering the fuel stream going to the cylinders in the engine. In typical arrangements, the by-pass metering orifice mechanisms are the device that is manipulated by the pilot when the pilot adjusts the cockpit located mixture control lever. Also, there are metering devices that are designed to meter fuel in proportion to air flow into the engine induction system. Such systems can be as simple as a variable orifice in the fuel system that is actuated in parallel with the movement of the throttle plate or it can be more complex and result in adjustment of the fuel delivered to the engine as a direct result of sensing the dynamic and static air pressure at various points in the induction system and thereby, through a system of diaphragms and associated springs and metering devices, modulate the fuel flow to the engine in rough proportion to air flow to the engine. Ultimately all of these systems as employed for general aviation aircraft result in an arrangement whereby the pilot may manipulate the total fuel flow available to the engine through the use of the cockpit mixture control knob or lever; such adjustments are enhanced by one of the various methods by which the fuel flow is further modulated as the air flow to the engine is changed in response to the throttle movement or, in some case, in response to both throttle movement and ambient conditions.

In yet another embodiment, an existing aircraft or rotorcraft engine that is derated as to maximum continuous power, that is, the rated BHP of the engine as certified for operation for unrestricted periods of use under applicable Federal Aviation Administration regulations is less (due to deliberate restrictions in mass air flow through the engine) than the BHP that the engine is physically capable of delivering, may be reset in accord with the teachings hereof for full time lean run conditions for normal operations by eliminating the original restrictions on engine mass air flow. By such reconfiguration, such an engine, such as the model IO-540 Lycoming engine (sold by a unit of Textron, Inc., of Williamsport, Pa.) that is used on certain rotorcraft such as small helicopters, may be capable of delivering maximum continuous power for operation in a FTLR mode during unrestricted periods of use while delivering all of the BHp that the certification basis for the helicopter requires. In yet a further embodiment, for selected unusual operations, such as heavy lifts and/or high altitude or hot weather takeoffs, an option for use at rich AFR mixtures may be provided, to enable delivery of adequate power under such adverse conditions.

Thus, it can be seen that in an embodiment, the advantages of FTLR aircraft engine operation can be obtained even in existing aircraft. Such an aircraft may have an existing air cooled spark ignited piston engine with a first stated engine total displacement volume and a rated maximum horsepower, and be mechanically designed for operation using a rich air fuel mixture ratio to burn fuel and produce water and carbon dioxide emissions. Such engines normally have a plurality of cylinders, fuel injectors, and may include a compressor to increase the amount of combustion air in cylinders, by increasing the pressure of combustion air entering the cylinders to a first pressure level at a rated maximum horsepower. Such an existing engine may be substituted by a replacement spark ignited air cooled piston engine configured for full time lean run during normal operations. Alternately, in some cases, retrofitting or adjusting the existing engine may be sufficient to provide the selected adjustments and either compressor or additional cylinder displacement capability, to achieve the necessary changes in operating conditions required for normal FTLR engine operations. Normal operations for such FTLR engines may include takeoff, high power climb, and cruise flight conditions. The replacement or rebuilt FTLR air cooled engines have a second engine total displacement volume and a selected maximum horsepower, however, such engine is mechanically designed for operation using a lean air fuel mixture ratio. Like the existing engine which it replaces the FTLR replacement engine normally includes a plurality of cylinders, fuel injectors, and a compressor to increase the pressure of combustion air entering the cylinders to a second pressure level at which the FTLR engine is capable of producing at least the selected maximum horsepower while operating with lean AFR. As shown, for example in FIG. 2, it is possible to operate a replacement FTLR engine at a selected maximum horsepower that is equal to or greater than the rated maximum horsepower of the existing engine. To accomplish such operation additional air may be provided for combustion in FTLR engines. Compressors such as turbochargers may be utilized to provide a second manifold pressure level for operation of the FTLR engine that is greater than the first manifold pressure level for operation of an original engine, or for an original engine design.

In a FTLR engine, whether provided by replacement, retrofit of an existing engine, or configured as a FTLR engine in new condition, the mixture control is set up to provide a lean fuel air mixture ratio, meaning that the equivalence ratio is less than 1.0, as explained herein above. In an embodiment, the equivalence ratio may be provided in a range of from about 0.8 to about 0.9. In an embodiment, the equivalence ratio may be provided in a range of from about 0.85 and about 0.90.

In an embodiment, a FTLR engine may be provided with an electronic ignition system that is configured for providing selected spark timing commensurate with the lean fuel air mixture ratios at selected cylinder operating pressures. In an embodiment, the spark timing is configured for temporarily retarding the timing from about 2 to about 8 degrees from an initial normal setpoint value, described in more detail herein above. Such adjustments are particularly useful for limiting the CHT by retarding the timing when undesirable or unacceptably high CHTs are approached. Further, the sparking timing control may be configured for retarding spark timing in order to control operating conditions by including a margin of safety with respect to one or more selected adverse operating conditions. In an embodiment, such selected adverse operating conditions may include detonation. In an embodiment, such selected adverse operating conditions may include pre-ignition. In either case, timing may be retarded from about 2 degrees to about 8 degrees, to maintain safe operation.

In an embodiment, a FTLR engine can be provided to operate at at least 90% of the rated maximum horsepower of an existing engine, or a certain proposed or existing engine design in a particular aircraft configuration. In an embodiment, in excess of about 92% of the rated maxim horsepower may be provided. In an embodiment, at least 95% of the rated maxim horsepower may be provided. In yet another embodiment, the selected maximum horsepower of a FTLR engine may be equal to or greater than the rated maximum horsepower of an existing engine or of an existing engine design.

Also, it can be appreciated that emissions from a FTLR engine will fall well below that of a comparably sized engine (or even the same engine) set up to run with a rich AFR mixture. This of course is directly related to the lower BFSC provided by a FTLR engine when running at equivalent horsepower, as can be appreciated by reference to FIG. 2. Consequently, water and carbon dioxide emitted during full power operation of a FTLR engine such as during takeoff or climb conditions, will be substantially below emissions of a comparable engine set up for running under rich AFR conditions. In an embodiment, a FTLR engine may have from about 0.67 to about 0.80 of the amount of carbon dioxide emitted by a comparable prior art engine (or even the same engine when set up according to prior art conditions and practices).

An aircraft fitted with a FTLR engine may exploit increase range resulting from decreased BSFC of the FTLR engine. Such an aircraft may also enjoy substantially decreased carbon dioxide emissions, as noted above. Further, in an aircraft fitted with one or more FTLR engines (twin engines are relatively common in certain engine and aircraft size ranges), the passengers and crew will benefit from the virtual elimination of carbon monoxide emissions from the FTLR engine. Thus, dangers to the crew of incapacitation, and of passenger sickness, from breathing carbon monoxide (such as by way of leaky exhaust gas manifolds or exhaust stack tubing) is eliminated.

In an embodiment, a spark ignited air cooled aircraft engine can be provided with a normal FTLR operating mode as described herein above, but further include a standby operating mode wherein rich AFR mixture operation is selected and exploited. While such a set up includes the FTLR engine components and operational methods as generally described above, further details must be included. A fuel pump may be provided to supply fuel to the cylinders, as noted above. In an embodiment a fuel pump may operate in conjunction with other components to regulate the mixture, and thus regulate the AFR of the operating engine. Such other components may be separate from the fuel pump, or integral to the fuel pump, or both separate in part and integral in part to the fuel pump. Generally, however, for ease of reference, the combination of the fuel pump and the components which regulate the mixture can be collectively referred to as the fuel system. The fuel pump and the system components are operable for selectively responding to a first input and a second input. In response to a first input the fuel system can be configured to deliver a first output range of fuel flows to the cylinders of the engine that result in the lean AFRs and FTLR operation across a selected range of engine operations, or in an embodiment, across a range of high power engine operations, as described herein. In response to a second input, the fuel system can be configured to deliver a second output of fuel flows to the cylinders of the engine that result in rich AFRs across a selected range of MAP and RPM. The second described output is referred to herein as a standby operating mode. More particularly, in an embodiment, such an engine has a rated maximum horsepower and is configured for a normal operating mode wherein the first mixture level is a lean fuel air mixture. Such an engine has a normal operating mode including (a) takeoff power engine configurations, which may include full engine power takeoff configurations, (b) climb power configurations, which may include high climb power engine configurations that enable climb at from about 92% to about 100% of the rated maximum horsepower, or at least exceeding about 92% or the rated maximum horsepower, and (c) cruise power engine configurations. Further, in such an embodiment, the engine has a standby operating mode wherein the second mixture level provides a rich fuel air mixture and thereby allowing additional horsepower to be developed by the engine when adverse ambient environmental operating conditions will have inherently reduced the ability of the engine to produce power. In an embodiment, in an aircraft with two or more piston engines, each configured as taught herein as an FTLR engine, and each with a first normal operating mode wherein the first mixture level is a lean fuel air mixture. Each such engine on such multi-engine aircraft has a normal operating mode including takeoff power, which enables the engine to produce 100% of the rated maximum horsepower of prior art engines previously installed on same multi-engine aircraft. Further, in such an embodiment, each engine has a standby operating mode where the second said mixture level provides a rich fuel air mixture, and thereby, in the event of a mechanical failure, causing one engine to be shut down, the remaining engine(s) could be electively changed from the said normal operating mode, to the standby operating mode, thereby allowing additional horsepower to be developed during the emergency occasioned by the unexpected failure of one engine on the aircraft, and thereby enhancing the likely hood of a safe and uneventful outcome for the aircraft after the failure of one engine.

In an embodiment, the fuel injectors in a FTLR engine are precisely tuned to insure precisely regulated fuel flow to each one of said plurality of cylinders, so that each cylinder receives a lean fuel air mixture resulting in a substantially matched AFR as compared between various cylinders. In an embodiment, providing the FTLR engine will include provision of optimally sized orifices for the fuel injector orifices located in each one of the fuel injectors.

The compressed air supplied to each one of the plurality of cylinders is provided at a substantially uniform mass air flow rate to each cylinder. Such conditions may be especially significant during at least a portion of the normal operating mode of the engine, such as at takeoff, climb, or high power cruise conditions. In an embodiment, the just mentioned substantially constant mass air flow may be a result of an absolute manifold pressure in the range from about 30 inches of mercury to about 49 inches of mercury. In an embodiment, the substantially constant manifold pressure maybe an absolute pressure of from about 31 to about 33 inches of mercury.

In an embodiment, a FTLR engine may utilize an ignition circuit for use with a spark igniter for creating a spark for igniting fuel in the engine, wherein the ignition circuit includes one or more sensors responsive to actual operating conditions to generate an output signal, wherein the output signal provides spark timing in the engine to effect smooth combustion when the engine is operated with a lean air fuel mixture. In an embodiment of the FTLR engine wherein a standby mode is provided, the one or more sensors may be responsive to an abnormal ignition condition, and in response to receipt of an abnormal ignition condition signal from one or more of the sensors, the operation of the engine is converted from the normal operating mode to the standby operating mode.

While the fundamental requirement for changeover of an air cooled aircraft spark ignited engine from rich AFR mixture operations to FTLR operations involves increasing the throughput of air processed by the cylinders, there are several ways to achieve such results. As noted above, one way is to utilize a compressor, such as a supercharger, or an exhaust gas driven turbocharger. Alternately, in some engine configurations, the objective of increasing the total air mass flow through the engine may be accomplished by increasing the displacement of said engine; i.e. increase cylinder volume swept by the pistons.

In summary, whether by way of modification of existing aircraft engines to provide a FTLR engine, or by drop-in substitution of existing engine with replacement FTLR engines, or by way of providing new FTLR engines in new aircraft, the art of design and operation of high powered aircraft engines have been significantly advanced. Novel methods for FTLR operation and design, especially as applied to aircraft spark ignition engines have been developed, and initial tests reveal that significant improvements in fuel efficiency is provided by such full time lean run engine designs while operated at full and originally certified power. An important consideration is that such design and operational methods provides engines with reduced emissions of incompletely burned hydrocarbons, since when running at lean AFRs, unburned hydrocarbons are reduced to little or nothing, i.e. and ideally essentially zero, as the engine is able to provide sufficient excess air for combustion while providing stable operation in a desired operational range without ongoing rich AFR operation during key portions of a flight. Emissions of carbon dioxide are reduced roughly in proportion to the reduction in BSFC.

In the foregoing description, for purposes of explanation, numerous details have been set forth in order to provide a thorough understanding of the disclosed exemplary embodiments for the design of a novel full time lean run engine. However, certain of the described details may not be required in order to provide useful embodiments, or to practice a selected or other disclosed embodiments. Further, for descriptive purposes, various relative terms may be used. Terms that are relative only to a point of reference are not meant to be interpreted as absolute limitations, but are instead included in the foregoing description to facilitate understanding of the various aspects of the disclosed embodiments. And, various actions or activities in a method described herein may have been described as multiple discrete activities, in turn, in a manner that is most helpful in understanding the present invention. However, the order of description should not be construed as to imply that such activities are necessarily order dependent. In particular, certain operations may not necessarily need to be performed in the order of presentation. And, in different embodiments of the invention, one or more design or assembly activities may be performed simultaneously, or eliminated in part or in whole while other design or assembly activities may be added. Also, the reader will note that the phrase “in an embodiment” or “in one embodiment” has been used repeatedly. This phrase generally does not refer to the same embodiment; however, it may. Finally, the terms “comprising”, “having” and “including” should be considered synonymous, unless the context dictates otherwise.

Further, it should be understood by those of skill in the art and to whom this specification is directed that the term “aircraft” has been used herein consistent with US Federal Aviation Administration regulations to mean a device that is used or intended to be used for flight in the air. Under the same regulations and as used herein, the term “rotorcraft” means a heavier-than-air aircraft that depends principally for its support in flight on the lift generated by one or more rotors. Similarly, under the same regulations and as used herein, the term “helicopter” means a rotorcraft that, for its horizontal motion, depends principally on its engine-driven rotors. Finally, under the same regulations and as used herein, an “aircraft engine” means an engine that is used or is intended to be used for propelling aircraft. Appurtenances and accessories, and air compressors such as turbochargers, are normally considered by those of skill in the art, and under applicable FAA regulations, as components of the aircraft engines with respect to which they are operably connected.

Operation of an air cooled aircraft engine as a full time lean run engine as set forth in this disclosure has been particularly described with respect to the more significant operating modes, such as full power takeoff operations, full power climb or high power climb operation and high power cruise operation of the engine, but in one embodiment FTLR operations may also allow for operation of the engine using a lean AFR in other operations. However, in another useful embodiment, an engine configured for FTLR operations under full power takeoff operations, full power or high power climb conditions, or high power cruise conditions, can be set up as taught herein to provide for operation of the engine in other conditions at rich AFRs, including starting, idle, taxi and low power operations. Consequently, depending on the details of the mechanical arrangement of the engine, such other operational conditions may allow for and even benefit from operation with rich AFR mixture settings, while retaining the benefit of FTLR during the aforementioned high power takeoff, climb, and cruise operations.

Further it should be understood that references to selected or variable spark ignition timing may utilize various methods and machinery known to those of skill in the art to accomplish such variable spark ignition timing, whether through discrete manual adjustment, or through automated equipment for accomplishing such changes, through either mechanical or electronic devices, including further, using computerized embodiments, which may rely upon a variety of sensor inputs, used in varying combinations, including, but not limited to crank shaft rotational position, cam shaft rotational position, fuel flow, AFR, cylinder head temperatures, exhaust gas chemical composition, exhaust gas temperatures, engine rotational speed, engine MAP, engine induction air temperature, engine mass air flow, various combustion characteristics, such as internal cylinder pressures and the presence or absence of detonation or pre-ignition, among others.

Further it should be understood by those of skill in the art to whom this specification is directed aircraft piston engines normally operate over a defined range of engine crankshaft rotational speed, more commonly referred to as revolutions per minute (“RPM”). Such engines, because of certification requirements, are stated to have rated horsepower at a stated RPM. Thus, the full range of RPM conditions for engines as referred to herein should be considered to be included within the scope of claims set forth below, as applicable. Further, alterations in the stated RPM for any such engine as might be susceptible for utilization of the improvements described in this disclosure are to be treated as further variations within the teachings set forth herein.

Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures. Numerous modifications and variations are possible in light of the above teachings. Therefore, the protection afforded to this invention should be limited only by the claims set forth herein, and the legal equivalents thereof.

The invention claimed is:

1. In an aircraft designed for use with an existing air cooled spark ignited piston engine having a first stated engine total displacement volume and a rated maximum horsepower, said existing aircraft engine mechanically designed for operation using a rich air fuel mixture ratio for normal takeoff, full power, or high power operation, and combusting said fuel to produce emissions comprising water, and carbon dioxide, said engine utilizing a plurality of cylinders, fuel injectors, and a compressor to increase the pressure of combustion air entering said cylinders to a first pressure level consistent with said design maximum rated horsepower, the improvement comprising substitution of said existing engine with a replacement, or a reconfigured, or a rebuilt spark ignited air cooled piston engine configured for full time lean run during normal operations, said normal operations comprising takeoff, climb, and cruise flight conditions, said full time lean run air cooled engine having a second stated engine total displacement volume and a selected maximum horsepower, and mechanically designed for operation using a lean air fuel mixture ratio, said full time lean run engine comprising a plurality of cylinders, fuel injectors, and a compressor to increase the pressure of combustion air entering said cylinders to a second pressure level wherein said full time lean run air cooled engine is capable of providing at least said selected maximum horsepower, and wherein said selected maximum horsepower exceeds about 92% of said rated maximum horsepower.

2. The method as set forth in claim 1, wherein said selected maximum horsepower of said replacement engine is equal to or greater than said rated maximum horsepower of said existing engine.

3. The method as set forth in claim 1 wherein said second pressure level is greater than said first pressure level.

4. The method as set forth in claim 1 wherein said second stated engine total displacement volume is larger than the first stated engine total displacement volume.

5. The method as set forth in claim 1 wherein said second stated engine total displacement volume is the same as the first stated engine total displacement volume.

6. The method as set forth in claim 1, or in claim 2, or in claim 3, wherein said lean fuel air mixture ratio comprises an equivalence ratio of less than 1.0.

7. The method as set forth in claim 6, wherein said equivalence ratio is from about 0.8 to about 0.9.

8. The method as set forth in claim 6, wherein said equivalence ratio is between about 0.85 and about 0.90.

9. The method as set forth in claim 1, wherein said compressor comprises a turbocharger.

10. The method as set forth in claim 1, further comprising providing optimal orifice sizes for fuel injector orifices in each one of said fuel injectors.

11. The method as set forth in claim 1, further comprising an electronic ignition system, said electronic ignition system configured for providing variably selected spark timing commensurate with said lean fuel air mixture ratios at a selected engine manifold absolute pressure.

12. The method as set forth in claim 9, wherein spark timing is automatically adjusted and retarded from a normal value by about 2 to about 4 degrees, when undesirable or unacceptably high CHTs are approached or encountered, respectively.

13. In an aircraft designed for use with an existing air cooled spark ignited piston engine having a first stated engine total displacement volume and a rated maximum horsepower, said existing aircraft engine mechanically designed for operation using a rich air fuel mixture ratio for normal takeoff, and other full or high power operation, and combusting said fuel to produce emissions comprising water, carbon dioxide, and carbon monoxide, said engine utilizing a plurality of cylinders, fuel injectors, and a compressor to increase the pressure of combustion air entering said cylinders to a first pressure level consistent with said design maximum rated horsepower at a design engine RPM, the improvement comprising substitution of said existing engine with a replacement, or reconfigured, or rebuilt spark ignited air cooled piston engine configured for full time lean run during normal operations, said normal operations comprising takeoff, climb, and cruise flight conditions, said full time lean run air cooled engine having a second stated engine total displacement volume and a selected maximum horsepower at an RPM equivalent to said design engine RPM, and mechanically designed for operation using only a lean air fuel mixture ratio, during normal operations, said full time lean run engine comprising a plurality of cylinders, fuel injectors, and a compressor to increase the pressure of combustion air entering said cylinders to a second pressure level wherein said selected maximum horsepower is at least equal to said maximum rated horsepower.

14. The method as set forth in claim 13, further comprising an electronic ignition system, said electronic ignition system configured for providing variably selected spark timing commensurate with said lean fuel air mixture ratios at a selected engine manifold absolute pressure.

15. The method as set forth in claim 14, wherein spark timing comprises a normal value for a selected engine operating configuration, and wherein said spark timing is temporarily retarded from said normal value.

16. The method as set forth in claim 15, wherein said method of retarding spark timing is controlled with respect to a selected cylinder head temperature limit.

17. The method as set forth in claim 15, wherein said method of retarding spark timing is controlled to provide operating conditions including a margin of safety with respect to one or more selected adverse operating conditions.

18. The method as set forth in claim 17, wherein said one or more selected adverse operation conditions comprises detonation, and wherein timing may be retarded in a range of from about 2 to about 8 degrees from said normal value.

19. The method as set forth in claim 17, wherein said one or more selected adverse operation conditions comprises preignition, and wherein timing may be retarded in a range of from about 2 to about 8 degrees from said normal value.

20. The method as set forth in claim 1, or in claim 13, wherein during said takeoff, or in said climb or in said cruise conditions, the quantity of carbon dioxide emissions from said engine configured for full time lean run is from about 0.67 to about 0.80 of the amount of carbon dioxide emissions from said existing air cooled spark ignited piston engine during equivalent operating conditions.

21. The method as set forth in claim 13, wherein carbon monoxide emissions from said engine configured for full time lean run are reduced below levels of concern with respect to human health and the environment.

22. The method as set forth in claim 13, wherein said selected maximum horsepower of said replacement engine is equal to or greater than said rated maximum horsepower of said existing engine.

23. The method as set forth in claim 13, wherein said second pressure level is greater than said first pressure level.

24. The method as set forth in claim 13, wherein said second stated engine total displacement volume is larger than the first stated engine total displacement volume.

25. The method as set forth in claim 13 wherein said second stated engine total displacement volume is the same as the first stated engine total displacement volume.

26. The method as set forth in claim 13, wherein during said climb conditions, said replacement engine operates at a selected maximum horsepower that is 92% or more of said rated maximum horsepower.

27. The aircraft as set forth in claim 20, wherein said engine further comprises an electronic ignition system, said electronic ignition system configured for providing variably selected spark timing commensurate with said lean fuel air mixture ratios at selected engine manifold absolute pressures and selected lean AFR mixtures.

28. The aircraft as set forth in claim 27, wherein spark timing comprises a normal value for a selected engine operating configuration, and wherein said spark timing is temporarily adjustable so as to reduce the spark advance from said normal value.

29. The aircraft as set forth in claim 28, wherein said retarding spark timing is controllable with respect to a selected cylinder head temperature limit.

30. The aircraft as set forth in claim 28, wherein said retarding spark timing is controllable to provide operating conditions including a margin of safety with respect to one or more selected adverse operating conditions.

31. The aircraft as set forth in claim 30, wherein said one or more selected adverse operation conditions comprises detonation, and wherein timing may be retarded from about 2 to about 8 degrees from said normal value.

32. The method as set forth in claim 30, wherein said one or more selected adverse operation conditions comprises pre-ignition, and wherein timing may be retarded from about 2 to about 8 degrees from said normal value.

33. A method for modifying an aircraft having at least one existing air cooled spark ignition engine having a first stated engine total displacement volume and a rated maximum horsepower, said at least one existing engine designed for operation using a rich air fuel mixture ratio for takeoff, and full power and high power operation, said air cooled engine comprising a plurality of cylinders, fuel injectors, a fuel pump having a mixture level control operable for regulating the supply of fuel to provide first selected air fuel mixture range to said cylinders, and a compressor to increase the pressure of combustion air entering said cylinders to a first pressure level consistent at said rated maximum horsepower, said compressor comprising an adjustable output control for regulation of output pressure from said compressor, said method comprising:

adjusting said mixture level control to a second selected mixture range, said second selected fuel air mixture range comprising a fuel air mixture equivalence ratio less than 1.0;

setting said adjustable output control of said compressor to a second pressure level, said second pressure level higher than said first pressure level;

wherein said engine is operable in a normal operating mode comprising takeoff, high power climb, and high power cruise engine configurations, at said equivalence ratio, and wherein the operating horsepower of said engine exceeds 92% of said rated maximum horsepower.

34. The method as set forth in claim 33, wherein said operating horsepower is about 100% or more of said rated maximum horsepower.

35. The apparatus as set forth in claim 27, or in claim 33, wherein said equivalence ratio is between about 0.8 and about 0.9.

36. The apparatus as set forth in claim 27, or in claim 33, wherein said equivalence ratio is between about 0.85 and about 0.9.

37. The method as set forth in claim 33, further comprising an electronic ignition system, said electronic ignition system configured for providing selected spark timing commensurate with said lean fuel air mixture ratios at a selected engine manifold absolute pressure.

38. The method as set forth in claim 37, wherein spark timing comprises a normal value for a selected engine operating configuration, and wherein said spark timing is configured for temporary retardation from said normal value.

39. The method as set forth in claim 38, wherein said retarding spark timing is controllable with respect to a selected cylinder head temperature limit.

40. The method as set forth in claim 38, wherein said retarding spark timing is controllable to provide operating conditions including a margin of safety with respect to one or more selected adverse operating conditions.

41. The aircraft as set forth in claim 40, wherein said one or more selected adverse operation conditions comprises detonation, and wherein timing may be retarded from about 2 to about 8 degrees from said normal value.

42. The method as set forth in claim 41, wherein said one or more selected adverse operation conditions comprises pre-ignition, and wherein timing may be retarded from about 2 to about 8 degrees from said normal value.

43. In an aircraft designed for use with an existing air cooled spark ignited piston engine having a first stated engine total displacement volume, and a first stated compression ratio, and a rated maximum horsepower, said existing engine mechanically designed for operation using a rich air fuel mixture ratio, and combusting said fuel to produce emissions comprising water, carbon dioxide, and carbon monoxide, said engine utilizing a plurality of cylinders and fuel injectors, a method for improvement of the aircraft, comprising substitution of said existing engine with a replacement or rebuilt spark ignited air cooled piston engine configured for full time lean run during normal operations, said normal operations comprising full power takeoff, climb, and cruise flight conditions, said full time lean run air cooled engine having a second stated engine total displacement volume, said second stated engine total displacement volume larger than said first stated engine total displacement volume, a second stated compression ratio, a selected maximum horsepower, said full time lean run air cooled engine designed for operation using a lean air fuel mixture ratio, said full time lean run engine comprising a plurality of cylinders, fuel injectors, wherein said full time lean run air cooled engine is capable of providing continuous horsepower at said selected maximum horsepower.

44. The method as set forth in claim 43, wherein said selected maximum horsepower is equal to or greater than said rated maximum horsepower.

45. The method as set forth in claim 43, or in claim 44, wherein said lean fuel air mixture ratio comprises an equivalence ratio of less than 1.0.

46. The method as set forth in claim 45, wherein said equivalence ratio is from about 0.8 to about 0.9.

47. The method as set forth in claim 45, wherein said equivalence ratio is between about 0.85 and about 0.90.

48. The method as set forth in claim 43, wherein the said engine is modified to increase the compression ratio of said engine from its first stated value to a second stated value while still being operated with an equivalence ratio that is less than 1.0.

49. The method as set forth in claim 48, wherein said equivalence ratio is from about 0.8 to about 0.9.

50. The method as set forth in claim 43, wherein said equivalence ratio is between about 0.85 and about 0.90.

51. The method as set forth in claim 43, 48, 49, or 50, further comprising an electronic ignition system, said electronic ignition system configured to provide selected spark timing commensurate with said lean fuel air mixture ratios at selected engine manifold absolute pressures.

52. The method as set forth in claim 51, wherein spark timing is adjustably retardable from a normal set point value.

53. The method as set forth in claim 51, wherein retarding of said spark timing is controlled with respect to a selected cylinder head temperature limit.

54. The method set forth in claim 52, wherein retarding of said spark timing is controlled to provide operating conditions including a margin of safety with respect to one or more selected adverse operating conditions.

55. The method as set forth in claim 54, wherein said one or more selected adverse operation conditions comprises detonation, and wherein timing may be retarded from about 2 to about 8 degrees from said normal set point value.

56. The method as set forth in claim 54, wherein said one or more selected adverse operation conditions comprises pre-ignition, and wherein timing may be retarded from about 2 to about 8 degrees from said normal set point value.

57. The method as set forth in claim 1, or in claim 13, or in claim 39, or in claim 43, wherein said fuel injectors are tuned to provide precisely regulated fuel flow to each one of said plurality of cylinders, wherein each cylinder receives a lean fuel air mixture, and wherein air fuel mixtures are substantially matched as compared between cylinders.

* * * * *

UNITED STATES PATENT AND TRADEMARK OFFICE

CERTIFICATE OF CORRECTION

PATENT NO. : 8,205,331 B2
APPLICATION NO. : 12/359984
DATED : June 26, 2012
INVENTOR(S) : George W. Braly It is certified that error appears in the above-identified patent and that said Letters Patent is hereby corrected as shown below:

IN THE SPECIFICATION:

Column 2, line 60, delete "case" and substitute therefore --cases--.

Column 6, line 56, after the words "at point", delete "10" and substitute therefore --1C--.

Column 7, line 4, after the words "at points", delete "10" and substitute therefore --1C--.

Column 7, line 9, after the words "at point", delete "10" and substitute therefore --1C--.

Column 11, line 8, after the word "equipment", delete "manufactures" and substitute therefore --manufacturers--.

Column 20, line 24, after the words "enhancing the", delete "likely hood" and substitute therefore --likelihood--.

Signed and Sealed this
Nineteenth Day of February, 2013

Teresa Stanek Rea
*Acting Director of the United States Patent and Trademark Office*